(12) United States Patent
Wang et al.

(10) Patent No.: US 10,429,569 B2
(45) Date of Patent: Oct. 1, 2019

(54) DISPLAY DEVICE

(71) Applicant: InnoLux Corporation, Miao-Li County (TW)

(72) Inventors: Hui-Chi Wang, Miao-Li County (TW); Yen-Liang Chen, Miao-Li County (TW); Fang-Ho Lin, Miao-Li County (TW); Chin-Lung Ting, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/895,017

(22) Filed: Feb. 13, 2018

(65) Prior Publication Data

US 2018/0284338 A1 Oct. 4, 2018

Related U.S. Application Data

(60) Provisional application No. 62/478,680, filed on Mar. 30, 2017.

(30) Foreign Application Priority Data

Jul. 3, 2017 (CN) .......................... 2017 1 0530783

(51) Int. Cl.
*F21V 8/00* (2006.01)
*G02F 1/1335* (2006.01)

(52) U.S. Cl.
CPC ......... *G02B 6/0043* (2013.01); *G02B 6/0055* (2013.01); *G02B 6/0058* (2013.01); *G02B 6/0061* (2013.01); *G02F 1/133615* (2013.01); *G02F 2201/34* (2013.01); *G02F 2202/28* (2013.01)

(58) Field of Classification Search
CPC .. G02B 6/0043; G02B 6/0055; G02B 6/0058; G02B 6/0061; G02F 1/133615
USPC .......................................................... 362/606
See application file for complete search history.

(56) References Cited

U.S. PATENT DOCUMENTS

| | | | |
|---|---|---|---|
| 5,729,310 A | 3/1998 | Horiuchi et al. | |
| 5,751,386 A | 5/1998 | Kanda et al. | |
| 5,886,759 A * | 3/1999 | Mashino | G01D 11/28 349/113 |
| 6,447,135 B1 * | 9/2002 | Wortman | G02B 6/0055 362/327 |

(Continued)

FOREIGN PATENT DOCUMENTS

| | | |
|---|---|---|
| EP | 3187927 A1 | 7/2017 |
| JP | 2006171585 A | 6/2006 |
| JP | WO2016031397 A1 | 6/2017 |

*Primary Examiner* — Bryon T Gyllstrom
(74) *Attorney, Agent, or Firm* — Bacon & Thomas, PLLC

(57) ABSTRACT

A display device is disclosed, which includes a display panel and a backlight module. The backlight module is disposed corresponding to the display panel, and includes a light guide plate, at least one light emitting unit, a reflector and a first pattern. The light guide plate has a central region and an outer region, and the outer region is disposed around the central region. The at least one light emitting unit is disposed adjacent to the light guide plate. At least a part of the reflector is disposed corresponding to a bottom surface of the light guide plate. The first pattern is disposed corresponding to the outer region, and the reflector and the light guide plate are adhered via the first pattern.

20 Claims, 18 Drawing Sheets

(56) References Cited

U.S. PATENT DOCUMENTS

| | | | | |
|---|---|---|---|---|
| 9,632,228 | B2* | 4/2017 | Teragawa | G02B 6/0055 |
| 2002/0141174 | A1* | 10/2002 | Parker | A61M 21/02 |
| | | | | 362/612 |
| 2004/0022050 | A1* | 2/2004 | Yamashita | G02B 6/0021 |
| | | | | 362/615 |
| 2004/0042233 | A1* | 3/2004 | Suzuki | G02B 6/0028 |
| | | | | 362/561 |
| 2007/0081361 | A1* | 4/2007 | Clary | G02B 6/0055 |
| | | | | 362/624 |
| 2008/0232135 | A1* | 9/2008 | Kinder | G02B 6/0053 |
| | | | | 362/615 |
| 2012/0147627 | A1* | 6/2012 | Pan | G02B 6/0051 |
| | | | | 362/624 |
| 2013/0128150 | A1 | 5/2013 | Que et al. | |
| 2013/0263488 | A1 | 10/2013 | Wu et al. | |
| 2016/0299285 | A1 | 10/2016 | Lee et al. | |

\* cited by examiner

DISPLAY DEVICE

CROSS REFERENCE TO RELATED APPLICATION

This application claims the benefits of the Chinese Patent Application Serial Number 201710530783.8, filed on Jul. 3, 2017, the subject matter of which is incorporated herein by reference.

This application claims the benefit of filing date of U.S. Provisional Application Ser. No. 62/478,680, filed Mar. 30, 2017 under 35 USC § 119(e)(1).

BACKGROUND

1. Field

The present disclosure relates to a display device and, more particularly, to a display device in which a light guide plate and a reflector are adhered via a first pattern.

2. Description of Related Art

Recently, liquid display devices and other electronic devices equipped with liquid display panels such as mobile phones, tablets, or wearable devices are developed toward having thinner thickness. Hence, in the backlight module for providing backlight, the conventional cold cathode fluorescent lamps (CCFLs) are substituted with light emitting diodes (LEDs) to reduce the volume of the backlight module. However, there are still some elements in the backlight module which may cause the overall volume of the backlight module unable to be reduced. Hence, a person skilled in the art still continuously makes effort on how to modify the backlight module to further reduce the thickness or the light of the backlight module.

SUMMARY

An object of the present disclosure is to provide a display device, wherein a light guide plate and a reflector are adhered via a first pattern to accomplish the purpose of fixing the light guide plate and the reflector. Therefore, the display device can be thin or light weight.

One embodiment of the present disclosure provides a display device, which comprises a display panel and a backlight module. The backlight module is disposed corresponding to the display panel, and comprises a light guide plate, at least one light emitting unit, a reflector and a first pattern. The light guide plate has a central region and an outer region, and the outer region is disposed around the central region. The at least one light emitting unit is disposed adjacent to the light guide plate. At least a part of the reflector is disposed corresponding to a bottom surface of the light guide plate. The first pattern is disposed corresponding to the outer region, and the reflector and the light guide plate are adhered via the first pattern.

DETAILED DESCRIPTION OF EMBODIMENT

For a person skilled in the art to understand the present disclosure, the following embodiments when read with the accompanying drawings are made to clearly exhibit the technical contents and effects to be accomplished of the present disclosure. The present disclosure is not limited to the following embodiments. In addition, it should be understood that the term "comprise(s)" and/or "have/has" used in the present specification refers to the presence of the said feature(s), region(s), step(s), operation(s) and/or unit(s), but does not exclude the presence or the addition of one or more other feature(s), region(s), step(s), operation(s) and/or unit(s). Furthermore, it should be noted that when one unit such as a layer or a region is defined as being or extending to be "on/above" the other unit (or a modification thereof), this unit can be directly or extend to be directly on/above the other unit or can be insert into the other unit. When one unit is defined as "directly" being or "directly" extending to be "on/above" the other unit (or a modification thereof), this unit cannot insert into the other unit. It should be noted that when one unit is "coupled" to the other unit (or a modification thereof), this unit can directly connect to the other unit or indirectly connect to the other unit via one or more other units (for example, electrical connection).

Figure 1:
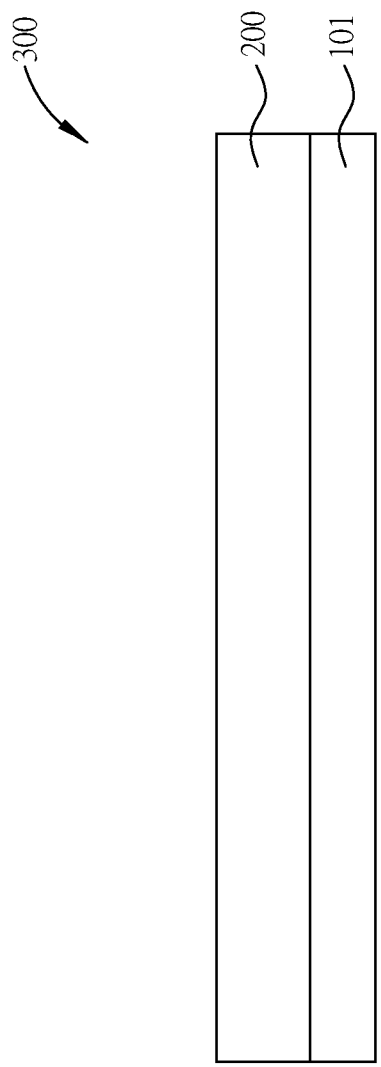
FIG. 1 is a perspective view showing a display device according to Embodiment 1 of the present disclosure.
Figure 2:
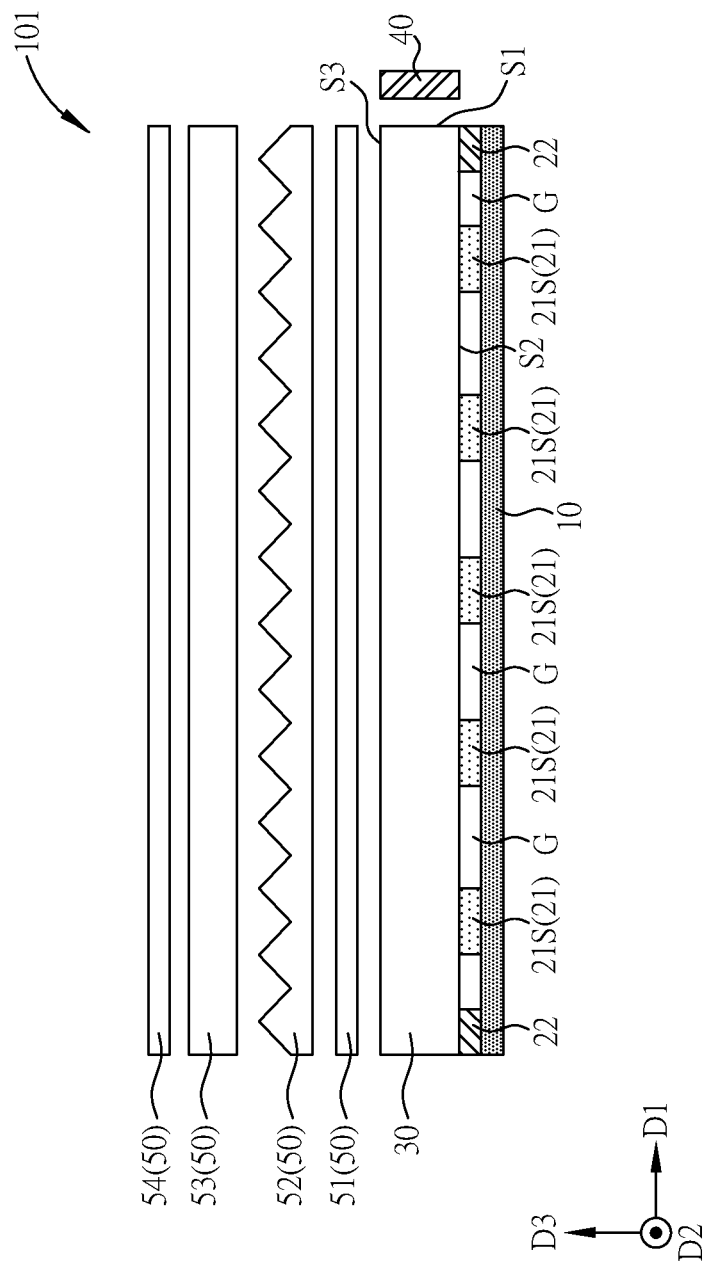
FIG. 2 is a cross-sectional view of a backlight module of a display device according to Embodiment 1 of the present disclosure.
Figure 3:
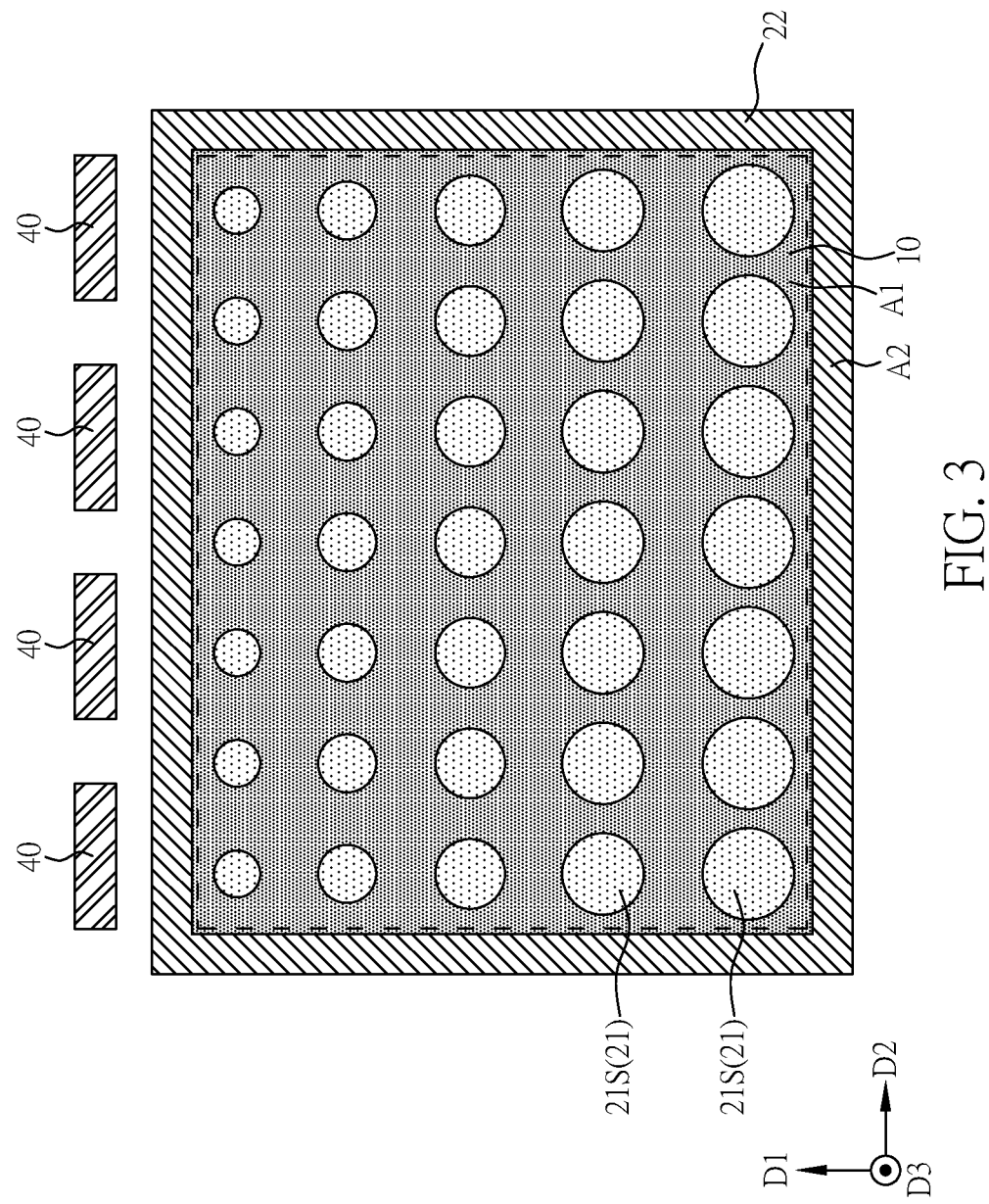
FIG. 3 is a top view of a backlight module of a display device according to Embodiment 1 of the present disclosure.
Figure 4:
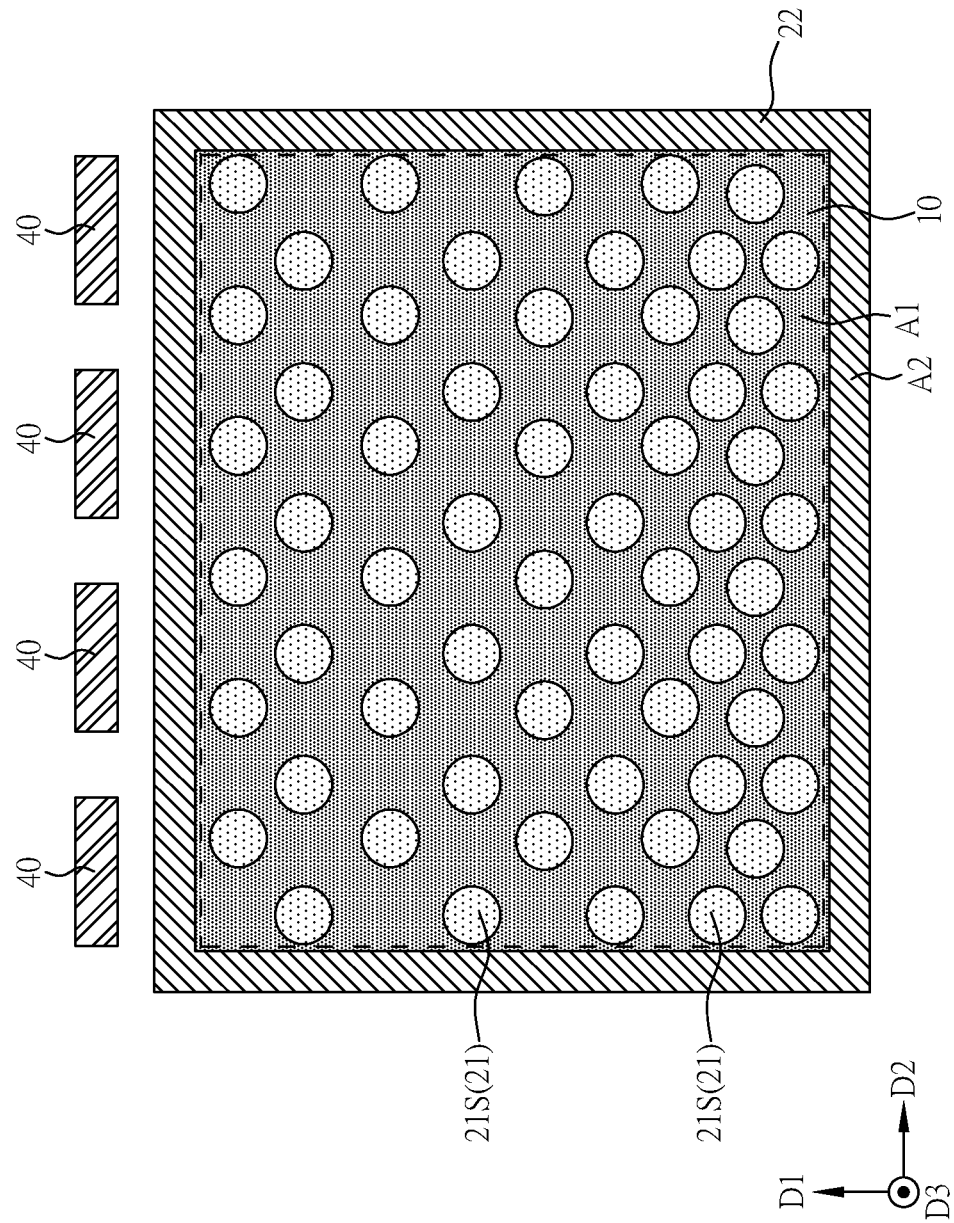
FIG. 4 is a top view of a backlight module of a display device according to another embodiment of the present disclosure.
Figure 5:
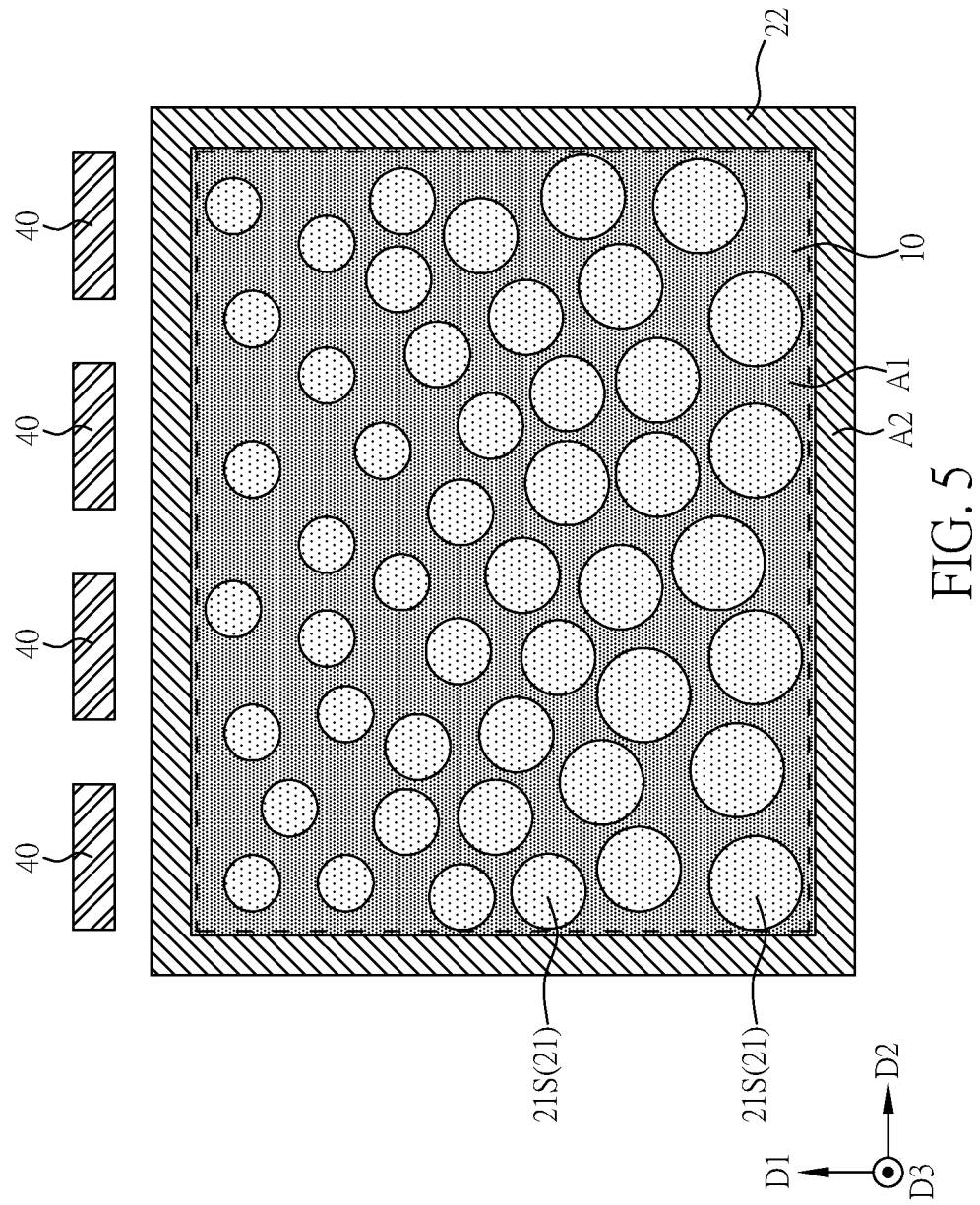
FIG. 5 is a top view of a backlight module of a display device according to still another embodiment of the present disclosure.
Figure 6:
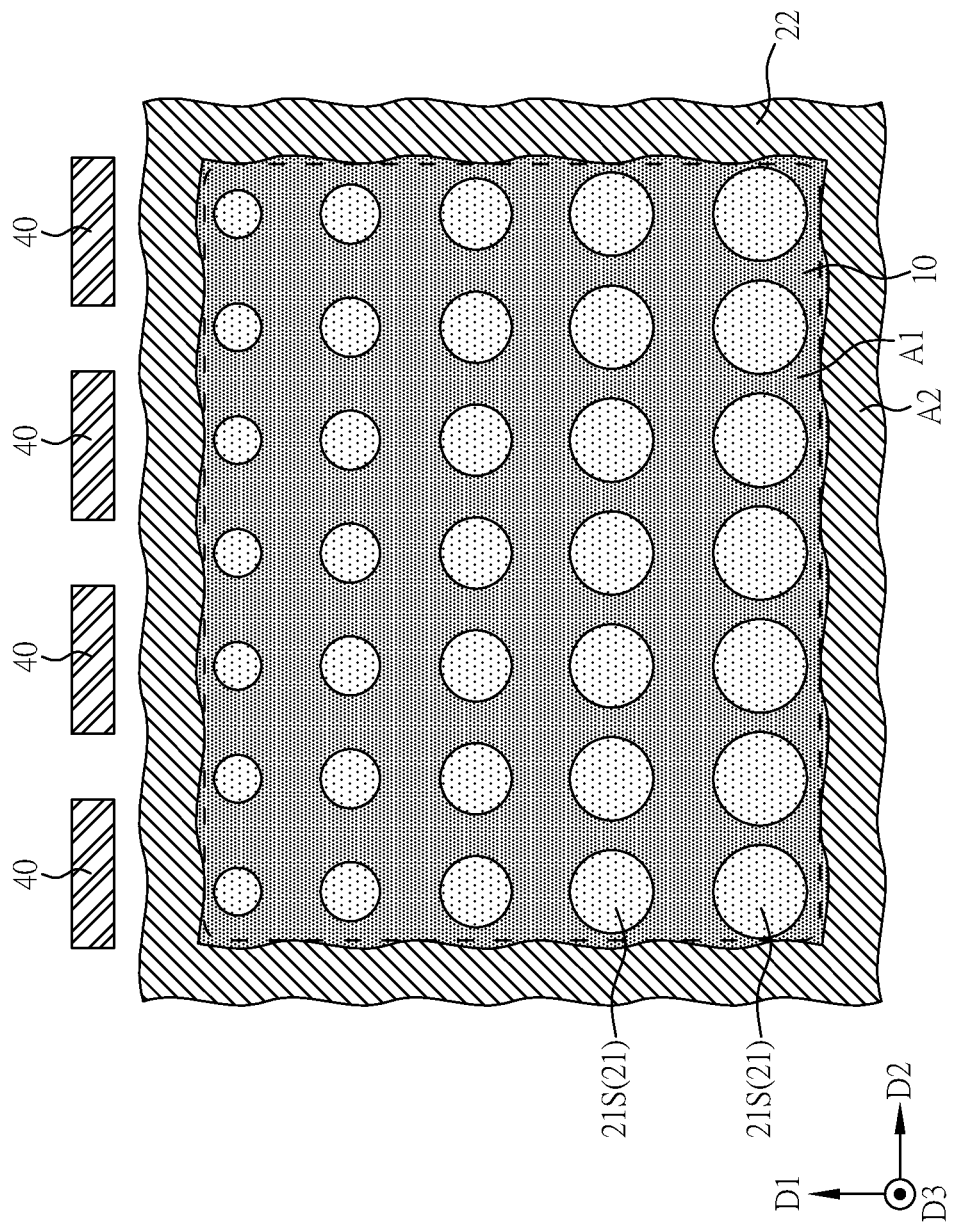
FIG. 6 is a top view of a backlight module of a display device according to further another embodiment of the present disclosure.

Please refer to FIG. 1 to FIG. 6. FIG. 1 is a perspective view showing a display device according to Embodiment 1 of the present disclosure, FIG. 2 is a cross-sectional view of a backlight module of a display device according to the present embodiment, FIG. 3 is a top view of a backlight module of a display device according to the present embodiment, FIG. 4 is a top view of a backlight module of a display device according to another embodiment of the present disclosure, FIG. 5 is a top view of a backlight module of a display device according to still another embodiment of the present disclosure, and FIG. 6 is a top view of a backlight module of a display device according to further another embodiment of the present disclosure. It should be noted that some elements in FIG. 3 to FIG. 6 are not shown to clearly illustrate the technical features of the present embodiment. As shown in FIG. 1, the present embodiment provides a display device 300. The display device 300 comprises a display panel 200 and a backlight module 101. The backlight module 101 is disposed corresponding to the display panel 200 to provide light to the display panel 200. In some embodiments, the display panel 200 may comprise a liquid crystal display panel, an electro-wetting display panel or other suitable non-self-luminous display panels. In some embodiments, the display device 300 can be a flexible display device, a touch display device or a curved display device, but the present disclosure is not limited thereto. As shown in FIG. 2 and FIG. 3, the backlight module 101 may comprise a light guide plate 30, at least one light emitting unit 40, a reflector 10 and a first pattern 22. In some embodiment, the backlight module 101 may further comprise a second pattern 21. The light guide plate 30 has a central region A1 and an outer region A2, and the outer region A2 is disposed adjacent to the central region A1. In one embodiment, the outer region A2 is disposed around the central region A1. The first pattern 22 is disposed corresponding to the outer region A2, and the reflector 10 and the light guide plate 30 are adhered via the first pattern 22. The outer region A2 is a region that the first pattern 22 substantially corresponds thereto, and the central region A1 is a region that the second pattern 21 substantially corresponds thereto; but the present disclosures is not limited thereto. The central region A1 can approximately correspond to a display region of the display panel 200, and the outer region A2 can approximately correspond to a border region of the display panel 200; but the present disclosure is not limited thereto. In some embodiments, the first pattern 22 can partially overlaps the display region along a third direction D3, or the second pattern 21 can be partially overlaps the border region along the third direction D3. In one embodiment, the third direction D3 may be a normal direction of an upper surface S3 of the light guide plate 30, or a thickness direction of the light guide plate 30. Herein, the border between the outer region A2 and the central region A1 substantially corresponds to an edge of the first pattern 22 close to the second pattern 21 (as indicated by the dashed lines shown in FIG. 3 to FIG. 6). The light guide plate 30 may comprise a polymer light guide plate (for example, formed by poly(methyl methacrylate) (PMMA)), a glass light guide plate, or other light guide plates formed by other materials; but the present disclosure is not limited thereto. The shape of the light guide plate 30 can be regular, irregular or asymmetric based on the design requirements. The light emitting unit 40 is disposed to be adjacent to the light guide plate 30. In one embodiment, the light emitting unit 40 can be disposed facing a side S1 of the light guide plate 30. In other embodiments, the light emitting unit 40 can be disposed corresponding to a bottom surface S2 of the light guide plate 30; but the present disclosure is not limited thereto. The light emitting unit 40 may comprise light emitting diodes (LEDs), quantum dots (QDs), fluorescence materials, phosphor materials, micro light-emitting diodes (micro LEDs), mini light-emitting diodes (mini LEDs) or other suitable light sources. In one embodiment, a chip size of the LED is about 300 μm to 10 mm, a chip size of the mini LED is about 100 μm to 300 μm, and a chip size of the micro LED is about 1 μm to 100 μm, but the present embodiment is not limited thereto. The reflector 10 is disposed adjacent to the light emitting unit 40, and at least one part of the reflector 10 is disposed corresponding to the bottom surface S2 of the light guide plate 30. However, the present disclosure is not limited thereto. The reflector 10 can have a single layered structure such as a single layered reflector, or a multi-layered structure laminated by layers of different materials. The second pattern 21 comprises plural dots 21S, the dots 21S are disposed between the reflector 10 and the light guide plate 30, and the dots 21S are disposed corresponding to the central region A1. The first pattern 22 is disposed between the reflector 10 and the light guide plate 30, and the first pattern 22 is disposed corresponding to the outer region A2. In some embodiments, the first pattern 22 can be used to bond the reflector 10 and the light guide plate 30, and the first pattern 22 contacts the reflector 10 and the light guide plate 30. The first pattern 22 can be disposed to be adjacent to at least one side of the light guide plate 30, but the present disclosure is not limited thereto. In some embodiments, the first pattern 22 can be disposed to be adjacent to four sides of the light guide plate 30, or the first pattern 22 can surround plural dots 21S. However, the present disclosure is not limited thereto. Furthermore, in some embodiments, the dots 21S can be arranged at a first direction D1 or/and a second direction D2. In one embodiment, the first direction D1 may be a normal direction of the side S1 of the light guide plate 30, or the first direction D1 may be perpendicular to the third direction D3. The second direction D2 is perpendicular to the first direction D1 and the third direction D3. The dots 21S may influence the path of the light emitting from the bottom of the light guide plate 30 and the path of the light reflected by the reflector 10, so the shapes, sizes and arrangement of the dots 21S can be modified based on the requirement for optical effects. For example, the dots 21S can have different sizes (for example, the condition shown in FIG. 3); that is, at least two of the dots 21S may have different sizes. For example, the size of the dots 21S close to the light emitting unit 40 are relatively small, and the size of the dots 21S far away from the light emitting unit 40 are relatively large; but the present disclosure is not limited thereto. In some embodiments (for example, the condition shown in FIG. 4), the sizes of the dots 21S can be substantially identical, and the dots 21S can be arranged in a staggered manner. However, the present disclosure is not limited thereto. In some embodiments (for example, the condition shown in FIG. 5), at least a part of the dots 21S may have different sizes, and the dots 21S can be arranged in a random manner. However, the present disclosure is not limited thereto. In addition, in some embodiments, the dots 21S are separated from each other, so gaps G (as shown in FIG. 2) exist between the dots 21S, and gaps G also exist between the dots 21S and the first pattern 22. However, the present disclosure is not limited thereto. In some embodiments, a part of the dots 21S may be connected, and the first pattern 22 may be connected to a part of the dots 21S. In one embodiment, the gaps G can be an air gap or a gap filled with other materials; but the present disclosure is not limited thereto.

In some embodiments, the first pattern 22 may comprise an adhesive to bond the reflector 10 and the light guide plate 30. The aforesaid adhesive may comprise an optical clear adhesive (OCA), acrylic, silicone, an UV setting adhesive, a thermal setting adhesive, optical clear resin (OCR) or other suitable adhesives; but the present disclosure is not limited thereto. In some embodiment, the first pattern 22 may be a semi-solid adhesive or an adhesive with high viscosity, so the first pattern 22 may have smooth edges (as shown in FIG. 3 to FIG. 5 and FIG. 11). In some embodiment, the first pattern 22 may be a liquid-like adhesive or an adhesive with low viscosity, so the first pattern 22 may have irregular edges (as shown in FIG. 6). However, the present disclosure is not limited thereto. When the first pattern 22 has irregular edges, the border between the outer region A2 and the central region A1 substantially corresponds to a connection line of top points of protrusions of an edge of the first pattern 22 close to the second pattern 21 (as indicated by the dashed lines shown in FIG. 6). In addition, for example, the border may be curved at the corner or at other region; but the present disclosure is not limited thereto. In some embodiments, the first pattern 22 may be formed by adhesives with different properties to form the first pattern. 22 with partial smooth edges and partial irregular edges; but the present disclosure is not limited thereto. In some embodiments, at least one of the dots 21S may contact both the light guide plate 30 and the reflector 10, and the light guide plate 30 and the reflector 10 are bond by the at least one of the dots 21S; but the present disclosure is not limited thereto. In some embodiments, at least one of the dots 21S may only contact the light guide plate 30 or the reflector 10. Furthermore, the dots 21S may comprise an adhesive, such as an optical clear adhesive (OCA), acrylic, silicone, an UV setting adhesive, a thermal setting adhesive, optical clear resin (OCR) or other suitable adhesives. Hence, the materials of the first pattern 22 and the dots 21S can be the same. Thus, the first pattern 22 and the dots 21S can be prepared by the same process such as a screen printing process to simplify the process. However, the present disclosure is not limited thereto. In other embodiments, the material of the dots 21S can be different from the material of the first pattern 22. The first pattern 22 is required to have better protection ability (for example, waterproof, moisture resistance, and oxygen resistance), and the dots 21S are required to have desired optical property. Even though both the first pattern 22 and the dots 21S comprise adhesives, the material of the first pattern 22 can be different from the material of the dots 21S. In other embodiments, the dots 21S may not be sticky or partially sticky; but the present disclosure is not limited thereto. In addition, in other embodiments, when the dots 21S are not sticky, the backlight module 101 may further comprise a third pattern (not shown in the figure), and the third pattern is disposed corresponding to the central region A1. In one embodiment, the third pattern may be disposed corresponding to the outer region A2, or may be disposed corresponding to both the central region A1 and the outer region A2. However, the present disclosure is not limited thereto. The area of the third pattern may be less than 25% area of the light guide plate 30. The third pattern may bond the light guide plate 30 and the reflector 10. The material of the third pattern can be identical to or different from the material of the first pattern 22. However, the present disclosure is not limited thereto.

Figure 7:
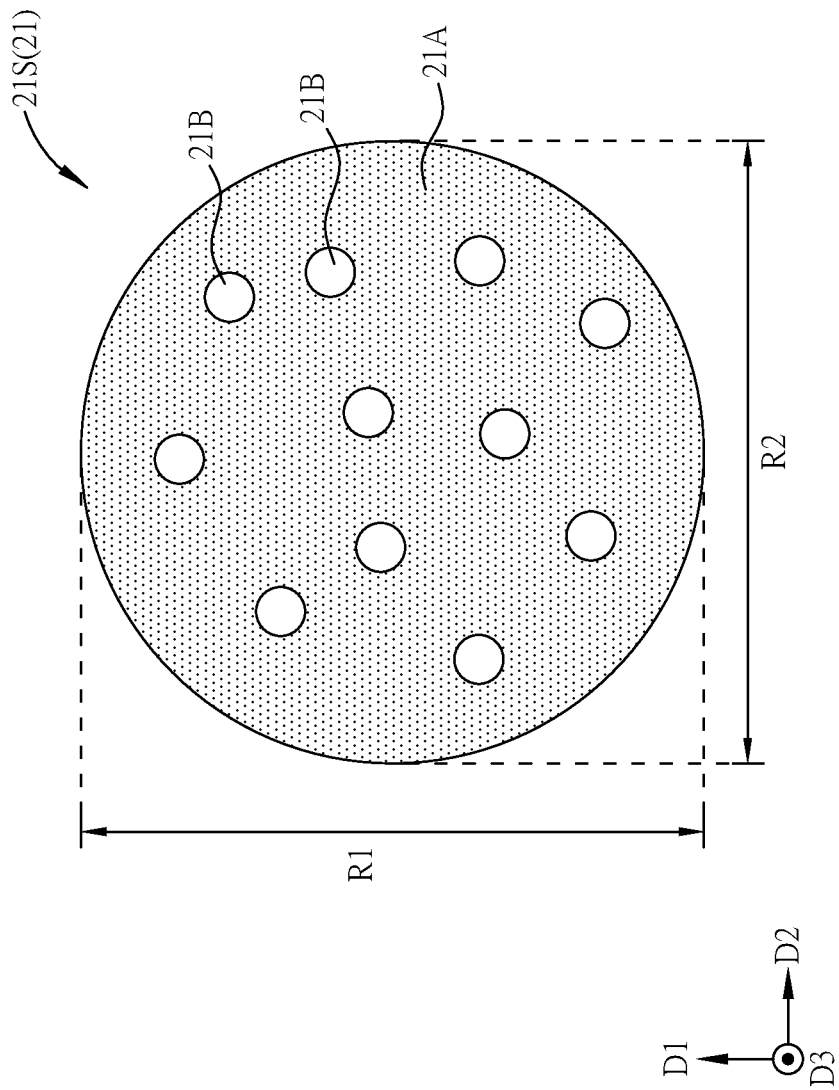
FIG. 7 is a top view of a dot according to Embodiment 1 of the present disclosure.
Figure 8:
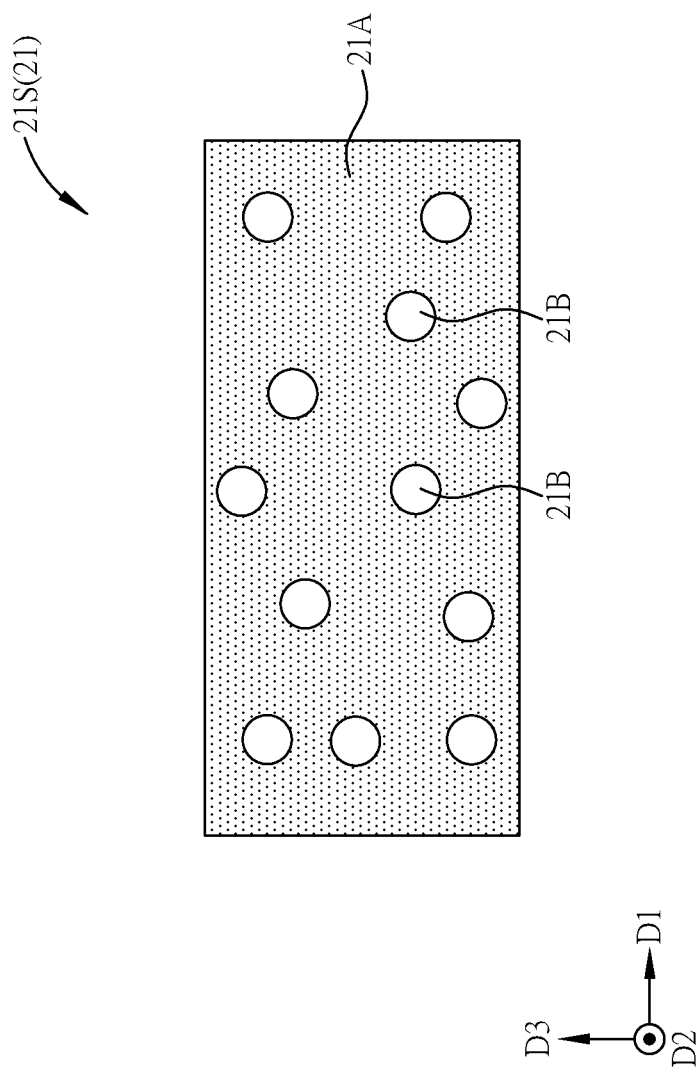
FIG. 8 is a cross-sectional view of a dot according to Embodiment 1 of the present disclosure.
Figure 9:
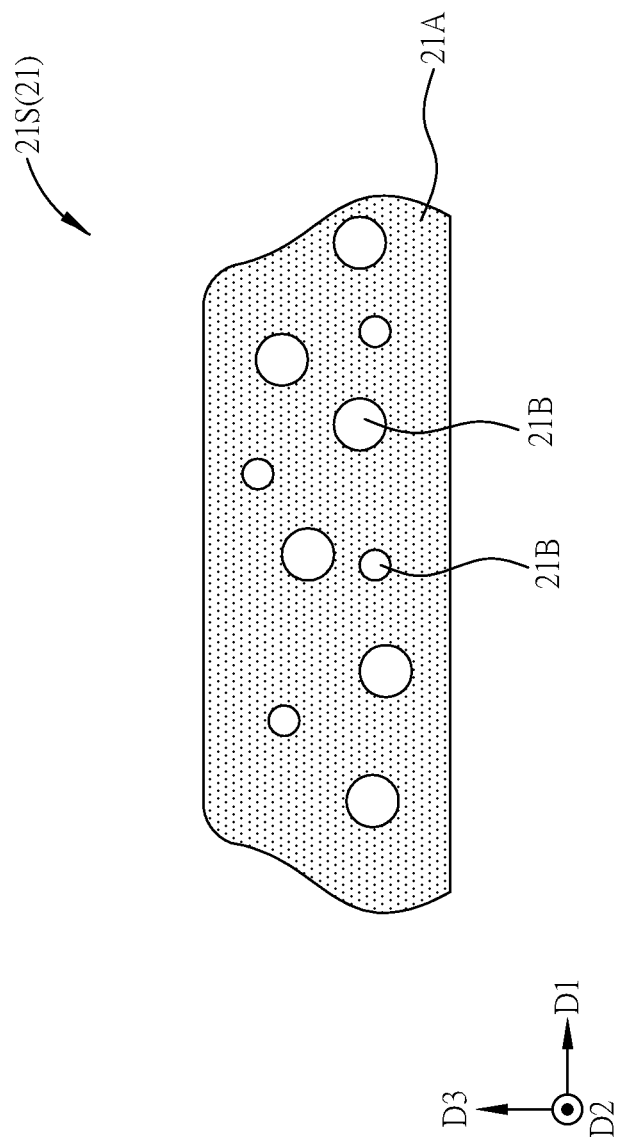
FIG. 9 is a cross-sectional view of a dot according to another embodiment of the present disclosure.
Figure 10:
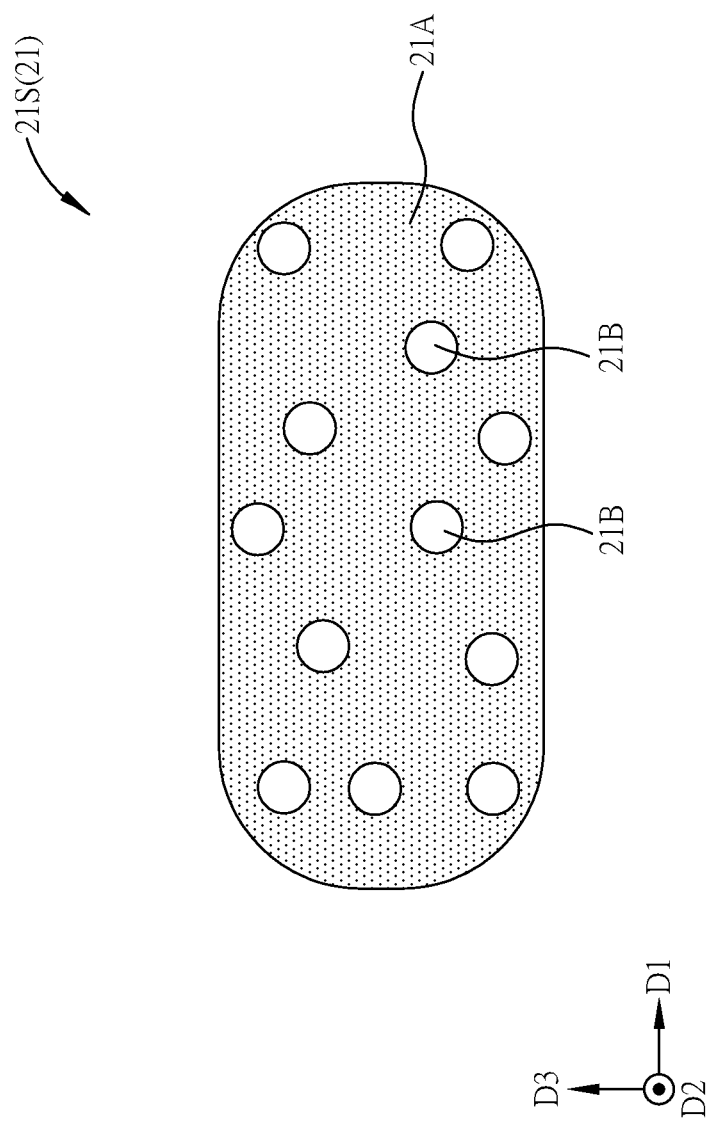
FIG. 10 is a cross-sectional view of a dot according to further another embodiment of the present disclosure.

Please refer to FIG. 7 to FIG. 10 and FIG. 2. FIG. 7 is a top view of a dot 21S according to the present embodiment, FIG. 8 is a cross-sectional view of a dot 21S according to the present embodiment, FIG. 9 is a cross-sectional view of a dot 21S according to another embodiment of the present disclosure, and FIG. 10 is a cross-sectional view of a dot 21S according to further another embodiment of the present disclosure. As shown in FIG. 7, FIG. 8 and FIG. 2, in some embodiments, the dot 21S may respectively have a first length. R1 at the first direction D1, a second length R2 at the second direction D2, and the first length R1 may be equal to the second length R2; but the present disclosure is not limited thereto. The first length R1 of the dot 21S may be different from the second length R2 thereof. In some embodiment, at least one dot 21S of the plural dots 21S may comprise a glue 21A; and plural particles 21B disposed in the glue 21A. The particles 21B may be dispersed in the glue 21A. The particles 21B in the dot 21S could maintain the height of the dot 21S to control the gap between the light guide plate 30 and the reflector 10. In some embodiments, the particles 21B may be reflective particles. The light path of the light emitting from the backlight module 101 can be adjusted by using the particles 21B with high reflectivity. Alternatively, in some embodiments, the particles 21B may be scattering particles. The difference between the refractive indexes of the particles 21B and the glue 21A can increase the scattering property of the dot 21S to adjust the light path of the light emitting from the backlight module 101. In addition, the particles 21B may be spheres or with other suitable shapes based on the requirement, but the present disclosure is not limited thereto. The particles 21B may be transparent, semi-transparent or dyed particles based on the requirement, but the present disclosure is not limited thereto. In addition, the diameter of the particles 21B may be ranged from 0.1 μm to 10 μm. In some embodiments, the size of the particles 21B may be substantially the same. In some embodiments, at least two of the plural particles 21B may have different sizes (for example, the condition shown in FIG. 9). However, the present disclosure is not limited thereto. The side of the dot 21S not contacting the light guide plate 30 or the reflector 10 may have an irregular shape (for example, the condition shown in FIG. 9), or a curved shape (for example, the condition shown in FIG. 10); but the present disclosure is not limited thereto. The particles 21B may be formed by an organic material (for example, acrylic polymer, polystyrene or polycarbonate) or an inorganic material (for example, $SiO_2$ or $TiO_2$); but the present disclosure is not limited thereto. In some embodiments, the dots 21B may further comprise pigments, and the diameter of the pigments may be ranged from 0.1 μm to 10 μm. The pigments can be used for dying or adjusting the optical quality; but the present disclosure is not limited thereto.

As shown in FIG. 2 and FIG. 3, in some embodiments, the second pattern 21 may be sticky, and at least a part of the dots 21S may bond the light guide plate 31 and the reflector 10. The first pattern 22 can be a closed pattern (as shown in FIG. 4) and surround the second pattern 21. The first pattern 22, the light guide plate 30 and the reflector 10 are connected to each other to form a closed space, so external environmental materials (for example, moisture or oxygen) could be blocked and may not enter into the closed space. Hence, the second pattern 21 in the closed space will not deteriorate, and the reliability of the display device can further be improved. In addition, when at least a part of the dots 21S are used to bond the light guide plate 30 and the reflector 10, the first pattern 22 located outside can be used to improve the adhering between the reflector 10 and the light guide plate 30. Therefore, the problem, that the waving of the reflector 10 which may influence the light emitting of the backlight module 101 could be improved.

In some embodiment (as shown in FIG. 2), the backlight module 101 may further comprise plural optical films 50 disposed on the light guide plate 30 at the third direction D3. The optical films 50 may have different arrangements according to the requirement for the light emitting. For example, the optical films 50 may comprise a bottom diffuser film 51, a bottom brightness enhancement film 52, an upper brightness enhancement film 53 and an upper diffuser film 54, wherein the upper diffuser film 54 is disposed on the bottom diffuser film 51 (for example, at the third direction D3), the bottom brightness enhancement film 52 is disposed between the bottom diffuser film 51 and the upper diffuser film 54, and the upper brightness enhancement film 53 is disposed between the bottom brightness enhancement film 52 and the upper diffuser film 54. However, the present disclosure is not limited thereto. In some embodiment, other optical films, such as a polarizer, may be disposed above the light guide plate 30; but the present disclosure is not limited thereto.

The reflector 10 can be adhered to and fixed to the light guide plate 30 via the first pattern 22, so the display device can be thinner and lighter. In one embodiment, the conventional bezel is not necessary to be used for immobilizing the reflector 10 and the light guide plate 30, so the thickness of the backlight module 101 and the display device can be reduced. In addition, the first pattern 22 can enhance the adhesion. The external moisture or oxygen may be blocked when the first pattern 22 surrounds the second pattern 21, so the quality of the second pattern 21 can be maintained to improve the reliability of the display device. In other embodiment, the second pattern 21 can be without stickiness or have partial stickiness, and the display device can be equipped with or without bezel. However, the present disclosure is not limited thereto.

Different embodiments of the present disclosure are illustrated hereinafter. For simple illustration, the different parts in each embodiment are illustrated in detail, and the illustrations for the identical parts are not repeated again. In addition, the same elements in all the embodiments of the present disclosure are marked by the same numbers for the purpose of easily comparisons between different embodiments.

Figure 11:
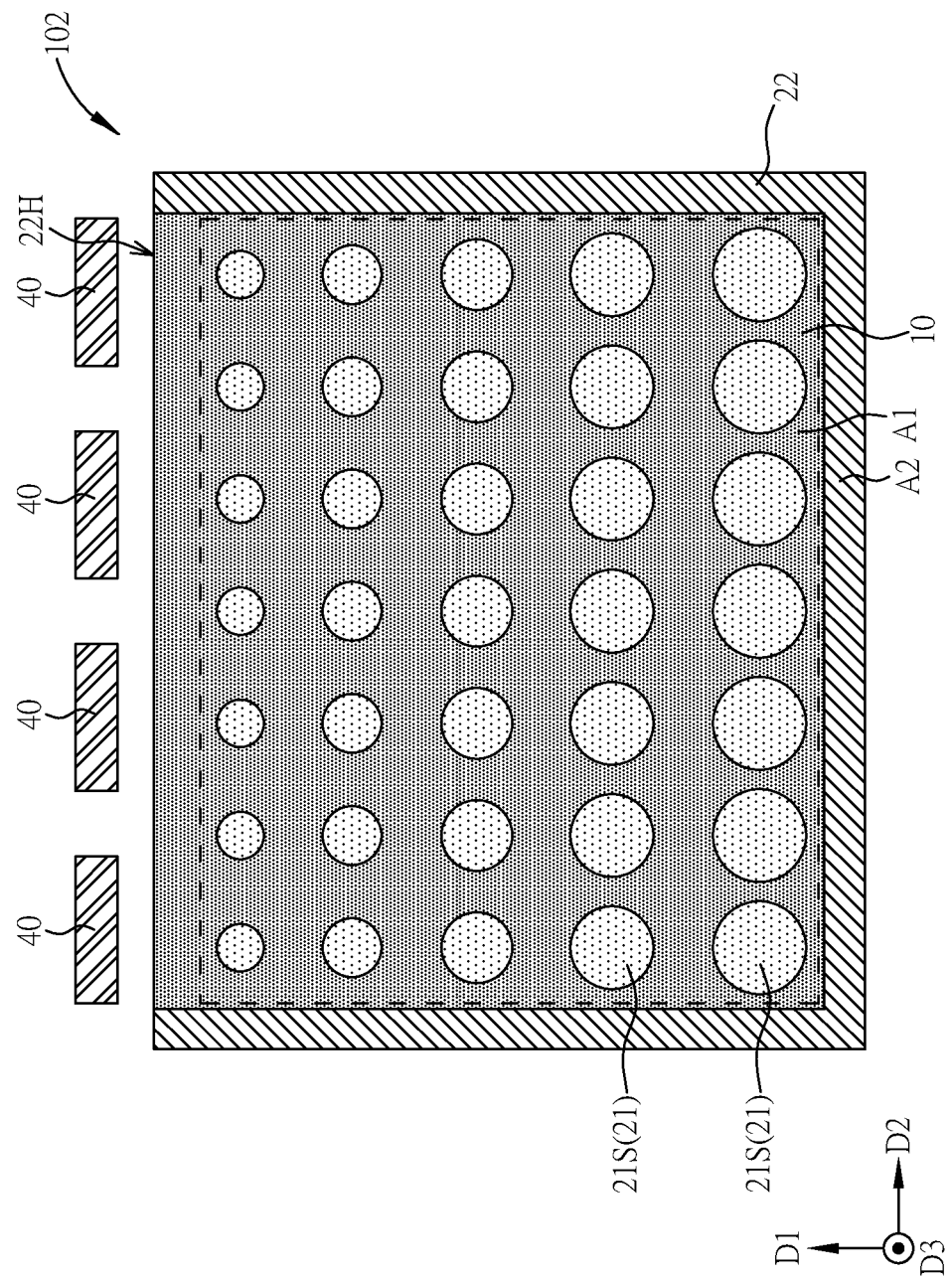
FIG. 11 is a top view of a backlight module of a display device according to Embodiment 2 of the present disclosure.

Please refer to FIG. 2 and FIG. 11. FIG. 11 is a top view of a backlight module of a display device according to Embodiment 2 of the present disclosure. Some elements are not shown in FIG. 11 to illustrate the feature of the present embodiment clearly. As shown in FIG. 11, the difference between the present embodiment and Embodiment 1 is that the first pattern 22 has at least one opening 22H, and the at least one opening 22H is disposed corresponding to the at least one light emitting unit 40. In the present embodiment, the first pattern 22 can be disposed at three sides of the light guide plate 30 and have an opening 22H (for example, at the side of the light guide plate 30 corresponding to the light emitting unit 40), and the light emitting unit 40 corresponds to the opening 22H. In other embodiments, the first pattern 22 may have plural openings 22H. For example, plural openings 22H can be discontinuously disposed at a side of the light guide plate 30 corresponding to the light emitting unit 40, and the light emitting unit 40 is disposed corresponding to the openings 22H. In one embodiment, at least one opening 22H may be disposed corresponding to one or more light emitting unit 40, but the present disclosure is not limited thereto. The disposition of the opening 22H can reduce the influence of the first pattern 22 on the light emitting from the light emitting unit 40. The number of the opening 22H can be adjusted according to the light emitting unit 40. For example, when the backlight module 102 comprises four light emitting units 40, the first pattern 22 can have four openings 22H, and each of the openings 22H is respectively disposed corresponding to each of the light emitting unit 40. In addition, the light emitting units 40 and the openings 22H of the first pattern 22 are not limited to be disposed at one side of the backlight module 102. For example, the light emitting units 40 may be disposed at two opposite sides or three or four sides of the backlight module 102, and the openings 22H corresponding to the light emitting units 40 can also be disposed at two opposite sides or three or four sides of the backlight module 102. In some embodiments, when plural openings 22H are disposed at one side of the light guide plate 30, the border between the outer region A2 and the central region A1 substantially corresponds to an edge of the first pattern 22 close to the second pattern 21. When only one opening 22H is disposed at one side of the light guide plate 30 corresponding to the light emitting unit 40, the outer region A2 substantially corresponds to the border region of the display panel 200 (as indicated by the dashed lines shown in FIG. 11), but the present disclosure is not limited thereto. In some embodiments, additional adhesive (or other glue) may be disposed at the opening 22H and is not disposed at the light emitting path to bond the light emitting unit 40 and the light guide plate 30 or the reflector 10 to further reduce the influence of the moisture or oxygen on the property of the second pattern 21. However, the present disclosure is not limited thereto.

Figure 12:
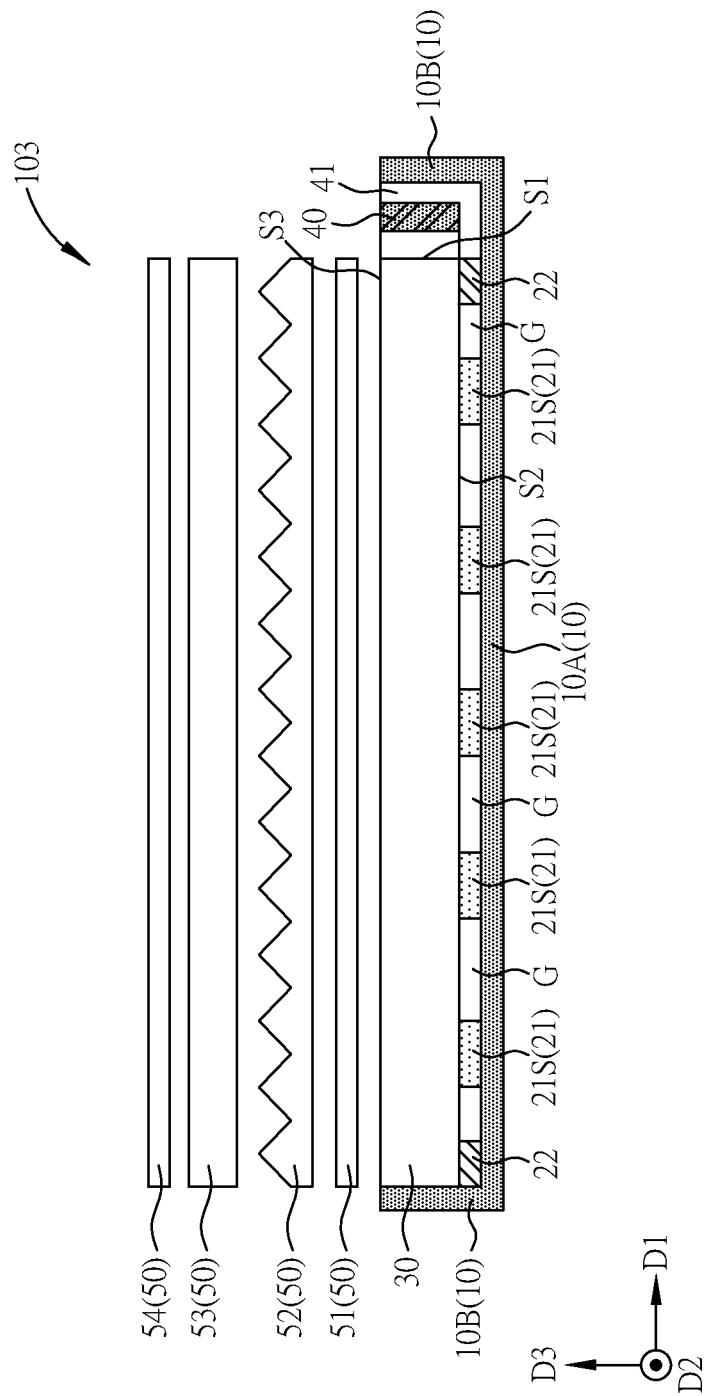
FIG. 12 is a cross-sectional view of a backlight module of a display devise according to Embodiment 3 of the present disclosure.
Figure 13:
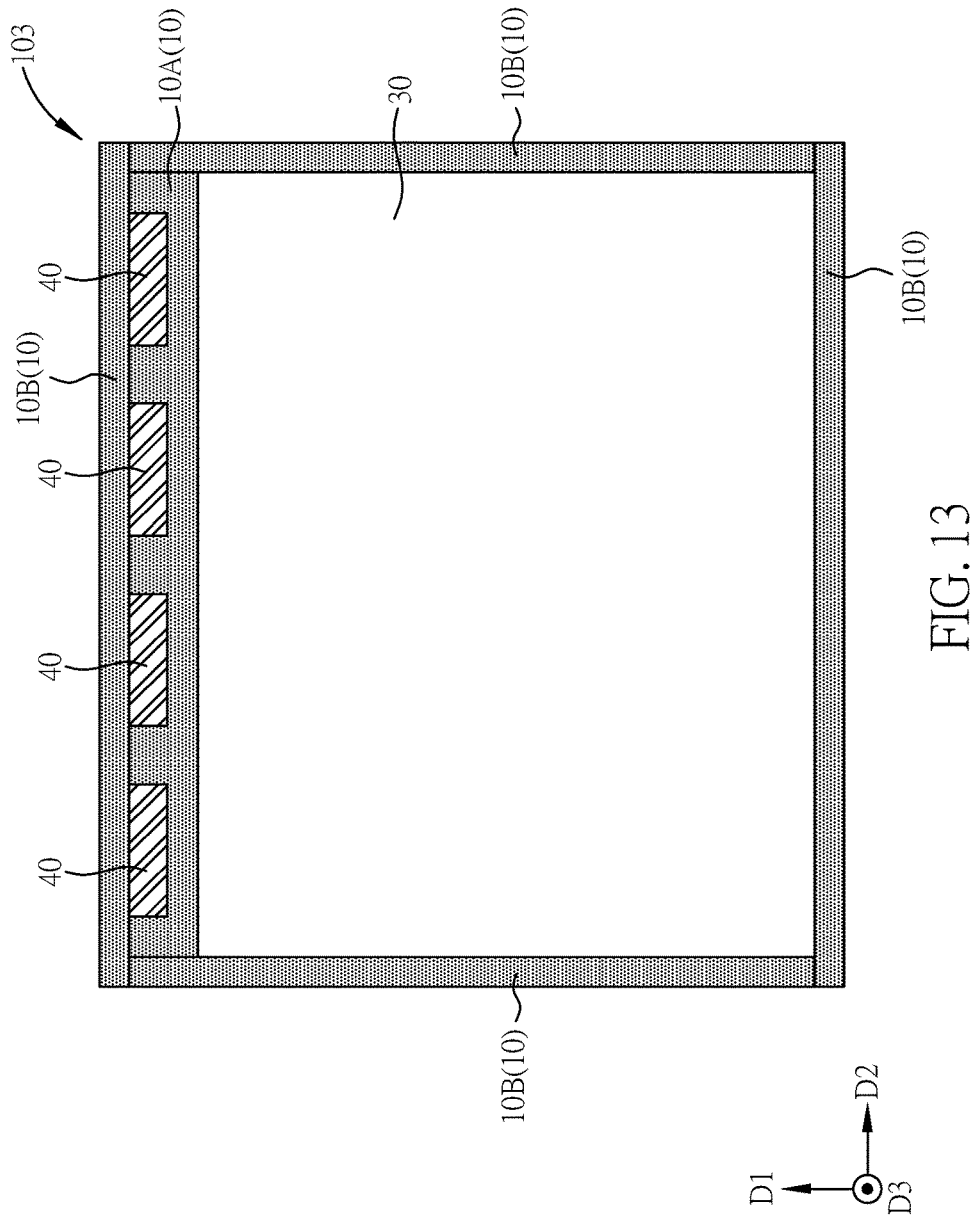
FIG. 13 is a top view of a backlight module of a display device according to Embodiment 3 of the present disclosure.

Please refer to FIG. 12 and FIG. 13. FIG. 12 is a cross-sectional view of a backlight module of a display device according to Embodiment 3 of the present disclosure; and FIG. 13 is a top view of a backlight module of a display device according to the present embodiment 3. Some elements are not shown to illustrate the feature of the present embodiment clearly. The difference between the present embodiment and Embodiment 1 is that the reflector 10 of the present embodiment further comprise a first portion 10A and a second portion 10B, wherein the first portion 10A is disposed corresponding to the bottom surface S2 of the light guide plate 30, the second portion 10B connects to the first portion 10A, and the second portion 10B is disposed corresponding to at least one side (for example, the side S1) of the light guide plate 30. In some embodiments, the second portion 10B can surround the light guide plate 30 and correspond to sides of the light guide plate 30 other than the bottom surface S2 and the upper surface S3. The shape of the light guide plate 30 is not particularly limited, and can be a rectangular shape or an irregular shape. When the reflector 10 has the second portion 10B disposed corresponding to the side S1, the immobilization of the light emitting unit 40 or the reflector 10 can be improved or the light emitting efficiency of the light guide plate 30 can be increased. In addition, the backlight module 103 may further comprise a carrier 41, and the light emitting unit 40 can be disposed on the carrier 41. The carrier 41 may comprise a circuit board electrically connecting to the light emitting unit 40 to control the light emitting of the light emitting unit 40. The carrier 41 and the light emitting unit 40 together can form a light bar, but the present disclosure is not limited thereto.

Figure 14:
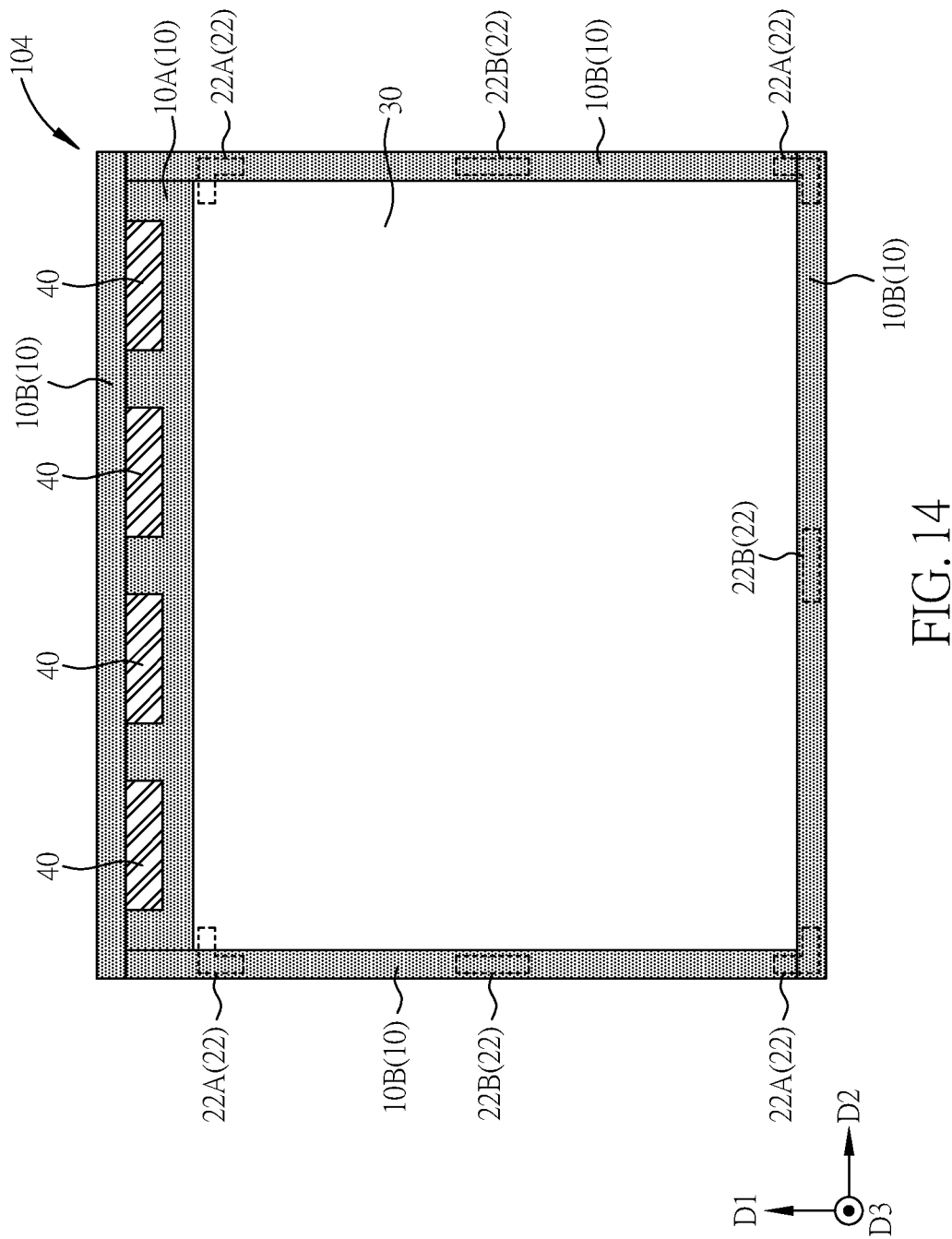
FIG. 14 is a top view of a backlight module of a display device according to Embodiment 4 of the present disclosure.

Please refer to FIG. 14. FIG. 14 is a top view of a backlight module of a display device according to Embodiment 4 of the present disclosure. As shown in FIG. 14, the difference between the present embodiment and Embodiment 3 is that the first pattern 22 may comprise plural first sub-patterns 22A and plural second sub-patterns 22B. The first sub-patterns 22A may be respectively disposed corresponding to corners of the light guide plate 30, and the second sub-patterns 22B may be respectively disposed corresponding to sides of the light guide plate 30. For example, the first pattern 22 may comprise four first sub-patterns 22A respectively disposed at four corners of the light guide plate 30, and the first sub-patterns 22A may respectively have uppercase L shapes; and the second sub-patterns 22B may respectively have uppercase I shapes. However, the present disclosure is not limited thereto. In some embodiments, the first pattern 22 may only comprise the aforesaid first sub-patterns 22A but does not comprise the second sub-patterns 22B disposed at the sides of the light guide plate 30. In other embodiments, the present disclosure is not limited thereto, and the first sub-patterns 22A and the second sub-patterns 22B may be selectively disposed according to the design requirement.

Figure 15:
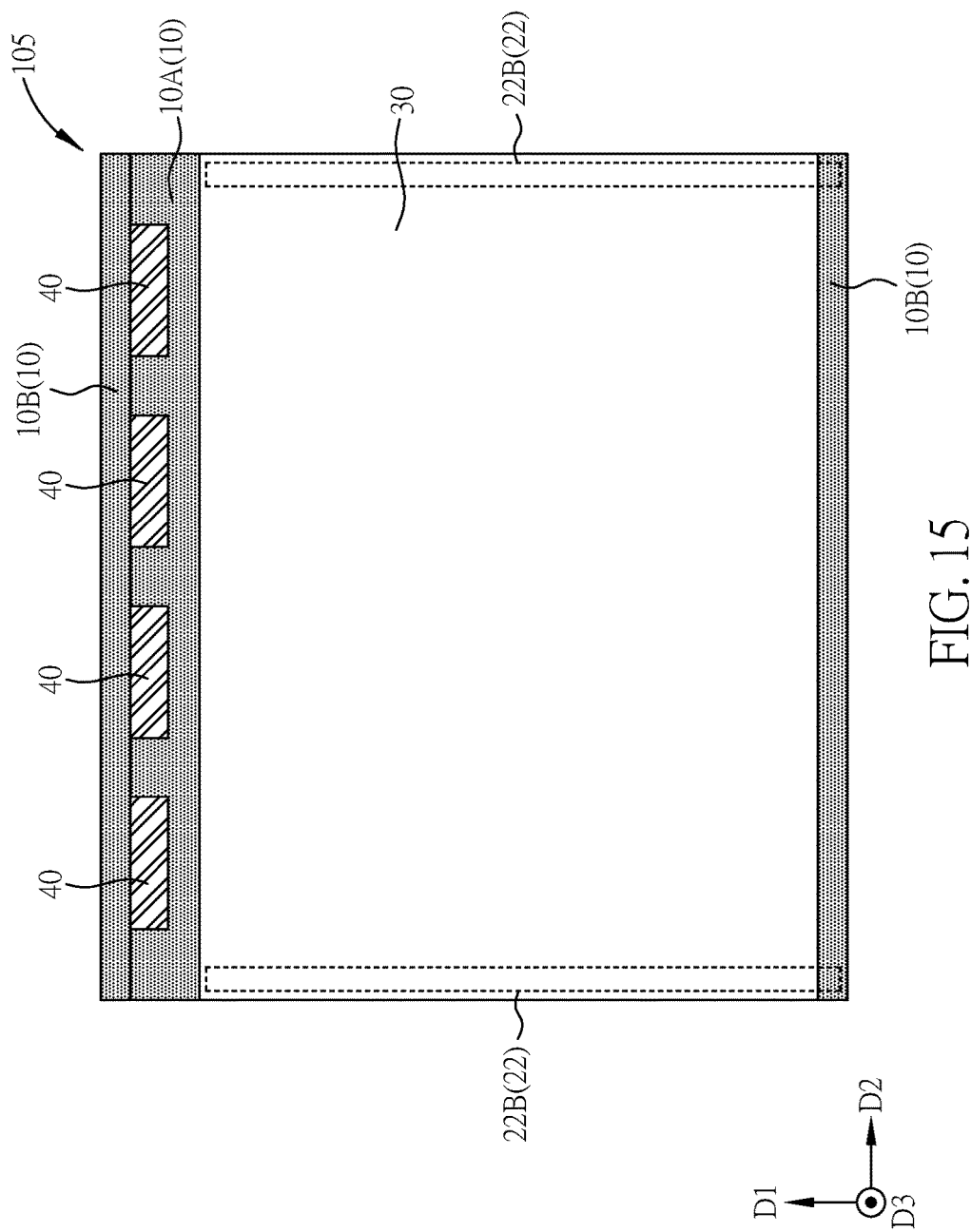
FIG. 15 is a top view of a backlight module of a display device according to Embodiment 5 of the present disclosure.

Please refer to FIG. 15. FIG. 15 is a top view of a backlight module of a display device according to Embodiment 5 of the present disclosure. As shown in FIG. 15, the difference between the present embodiment and Embodiment 4 is that the second portion 10B of the reflector 10 is only disposed at the incident side (adjacent to the light emitting units 40) and the far light side (away from the light emitting units 40) of the backlight module 105. In other words, the two sides of the light guide plate 30 which connect the incident side and the far light side are not equipped with the second portion 10B of the reflector 10. In addition, the first pattern 22 of the present embodiment may not comprise the first sub-pattern 22A (as shown in FIG. 14), and two second sub-patterns 22B are respectively disposed at the two sides of the light guide plate 30 which connect the incident side and the far light side to comply with the disposition of the second portion 10B of the reflector 10. However, the present disclosure is not limited thereto.

Figure 16:
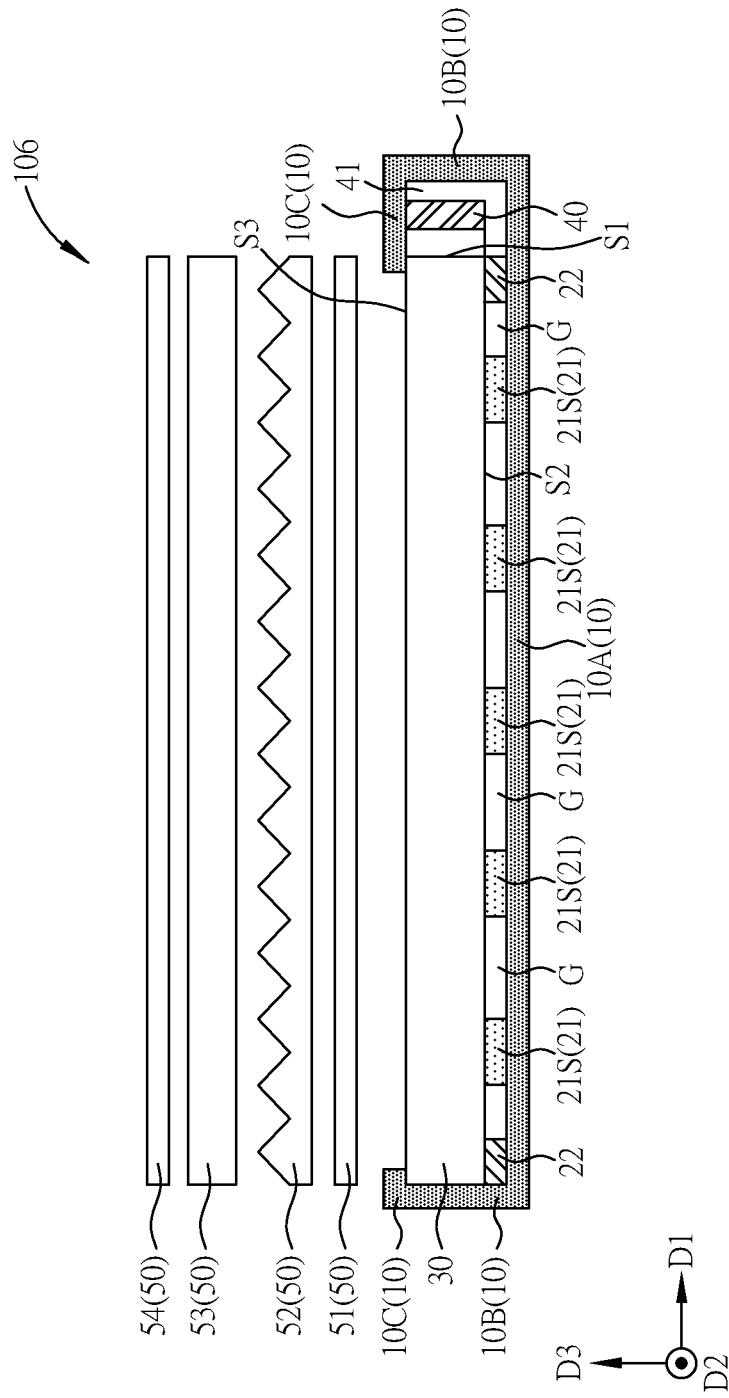
FIG. 16 is a perspective view of a backlight module of a display device according to Embodiment 6 of the present disclosure.

Please refer to FIG. 16. FIG. 16 is a perspective view of a backlight module of a display device according to Embodiment 6 of the present disclosure. As shown in FIG. 16, the difference between the present embodiment and Embodiment 3 is that the reflector 10 of the present embodiment may further comprise a third portion 10C disposed corresponding to a part of the upper surface S3 of the light guide plate 30. The third portion 10C connects to the second portion 10B. Therefore, immobilization of the reflector 10 can further be improved.

Figure 17:
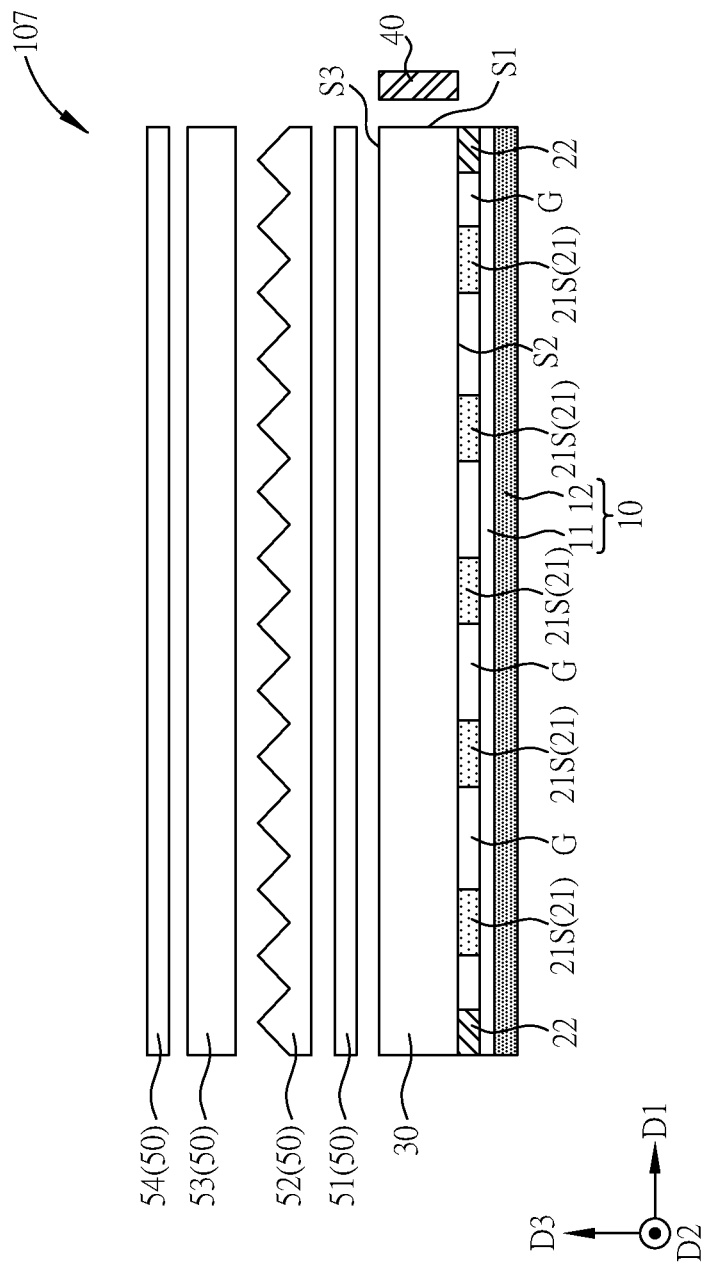
FIG. 17 is a perspective view of a backlight module of a display device according to Embodiment 7 of the present disclosure.

Please refer to FIG. 17. HG 17 is a perspective view of a backlight module of a display device according to Embodiment 7 of the present disclosure. As shown in FIG. 17, in the backlight module 107 of the present embodiment, the reflector may have a multi-layered structure, which comprises a matrix layer 11 and a reflective layer 12. The matrix layer 11 can be disposed between the reflective layer 12 and the second pattern 21. The matrix layer 11 may comprise a transparent matrix, other matrix which does not deteriorate the optical property of the reflective layer 12, or other matrix which may enhance the optical property of the reflective layer 12; but the present disclosure is not limited thereto. The reflective layer 12 may comprise a reflective plate, or other film or coating with reflective property; but the present disclosure is not limited thereto. The matrix layer 11 and the reflective layer 12 may or may not adhere to each other according to design requirements. In addition, both the matrix layer 11 and the reflective layer 12 may be films and adhere to each other. Alternatively, one of the matrix layer 11 and the reflective layer 12 is a film and the other is a coating layer applied onto the film. In addition, when the matrix layer 11 is a transparent matrix, the property of the transparent matrix may be similar to the property of the light guide plate 30. For example, when the light guide plate 30 is a glass light guide plate, the matrix layer 11 can be formed by glass. When the light guide plate 30 is a polymer (such as acrylic or PMMA) light guide plate, the matrix layer 11 can be formed by a polymer such as PMMA or other polymer with similar property. It should be noted that, the reflector 10 with the multi-layered structure shown in the present embodiment can also be applied to the aforesaid embodiments of the present disclosure, but the present disclosure is not limited thereto.

Figure 18:
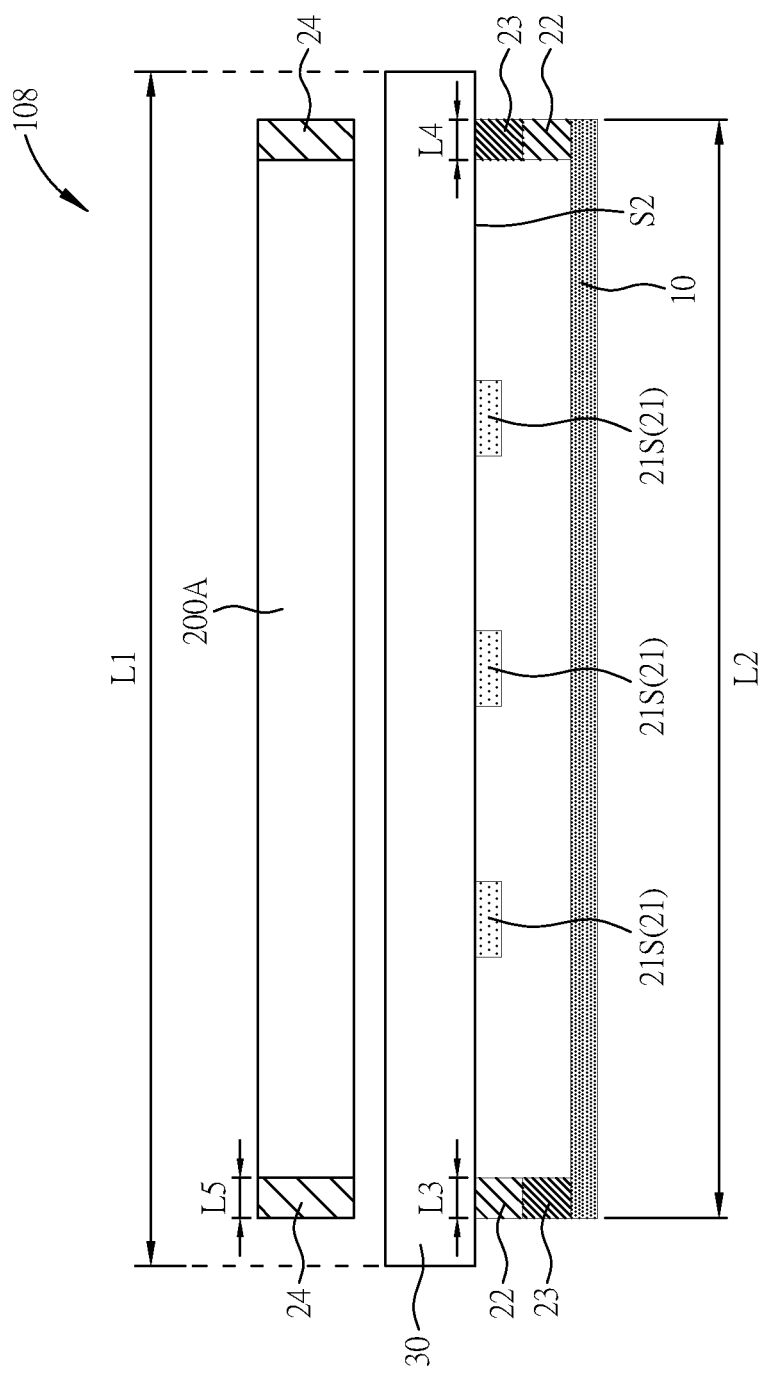
FIG. 18 is a perspective view of a backlight module of a display device according to Embodiment 8 of the present disclosure.

Please refer to FIG. 18. FIG. 18 is a perspective view of a backlight module 108 of a display device according to Embodiment 8 of the present disclosure. Some elements are not shown in FIG. 18 to illustrate the features of the present embodiment clearly. In the backlight module 108 of the present embodiment, in a cross-section of the display device along a normal direction of the upper surface of the light guide plate 30 (for example, as shown in FIG. 18), a width L1 of the light guide plate 30 may be larger than a width L2 of the reflector 10. The dots 21S may not be sticky, and the dots 21S can be disposed on the bottom surface S2 of the light guide plate 30. The backlight module 108 may further comprise a third pattern 23, the third pattern 23 is disposed between the light guide plate 30 and the reflector 10, the third pattern 23 is disposed corresponding to the first pattern 22, and the third pattern 23 can be formed by a light absorbing material. In one embodiment, an absorbance of the light absorbing material can be greater than 20%, but the present disclosure is not limited thereto. In some embodiments, the third pattern 23 may be disposed between the first pattern 22 and the reflector 10, or the third pattern 23 may be disposed between the light guide plate 30 and the first pattern 22; but the present disclosure is not limited thereto. In other embodiments, the display device is not equipped with the third pattern 23; wherein the first pattern 22 may have a single layer structure, which is sticky and is formed by a light absorbing material; or the first pattern 22 may have a multi-layered structure, wherein one of the multi-layers comprises a light absorbing material. However, the present disclosure is not limited thereto. In some embodiment, the aforementioned different embodiments can be combined. In some embodiments, a light shielding pattern 24 (black matrix, BM) may be disposed on a border region of the display panel 200A, and the first pattern 22 and the third pattern 23 may be disposed corresponding to the light shielding pattern 24. In a cross-section of the display device along a normal direction of the upper surface of the light guide plate 30 (for example, as shown in FIG. 18), a width L3 of the first pattern 22 may be less than or equal to a width L5 of the light shielding pattern 24, and the width L4 of the third pattern 23 may be less than or equal to the width L5 of the light shielding pattern 24. However, the present disclosure is not limited thereto. The relation between the width L3 of the first pattern 22 and the width L4 of the third pattern 23 is not limited. In the present disclosure, when the first pattern 22 absorbs light or when a light absorbing material is disposed corresponding to the first pattern 22, the light leakage occurred in the display region of the display panel can be decreased.

In conclusion, the first pattern can be used to bond the light guide plate and the reflector to immobilize the reflector on the light guide plate. In addition, the first pattern can block the influence from the external environment (for example, moisture or oxygen) which may deteriorate the material of the second pattern; and thus the reliability of the display device can be improved. In one embodiment, the display device of the present disclosure does not have to be equipped with a bezel, and the reflector is adhered to the light guide plate via an adhesive pattern; therefore, the purpose of reducing the size and the thickness of the display device can be achieved.

The above disclosures are only the embodiments of the present disclosure, and are not used to limit the present disclosure. For a person skilled in the art, various modifications and variations on the present disclosure can be made. Any modifications, substitutions, or improvements made without departing from the spirit and scope of the present disclosure are included in the claimed scope of the present disclosure.

What is claimed is:

1. A display device, comprising:
a display panel; and
a backlight module disposed corresponding to the display panel, wherein the backlight module comprises:
a light guide plate having a central region and an outer region, wherein the outer region is disposed around the central region;
at least one light emitting unit disposed adjacent to the light guide plate;
a reflector, wherein at least a part of the reflector is disposed corresponding to a bottom surface of the light guide plate;
a first pattern disposed corresponding to the outer region; and
a second pattern,
wherein the second pattern comprises plural dots disposed corresponding to the central region, and the reflector and the light guide plate are adhered via the first pattern.

2. The display device of claim 1, wherein the first pattern is disposed to be adjacent to at least one side of the light guide plate.

3. The display device of claim 1, wherein the first pattern has at least one opening, and the at least one opening is disposed corresponding to the at least one light emitting unit.

4. The display device of claim 1, wherein the first pattern has an irregular edge.

5. The display device of claim 1, wherein the first pattern comprises plural first sub-patterns and plural second sub-patterns, the first sub-patterns respectively correspond to corners of the light guide plate, and the second sub-patterns respectively correspond to sides of the light guide plate.

6. The display device of claim 1, wherein the reflector comprises:

a first portion disposed corresponding to the bottom surface of the light guide plate; and
a second portion connecting to the first portion, wherein the second portion is disposed corresponding to at least one side of the light guide plate.

7. The display device of claim 6, wherein the second portion of the reflector surrounds the light guide plate.

8. The display device of claim 6, wherein the reflector further comprises a third portion, the third portion connects to the second portion, and the third portion corresponds to a part of an upper surface of the light guide plate.

9. The display device of claim 1, wherein the dots are disposed between the reflector and the light guide plate.

10. The display device of claim 9, wherein gaps exist between the dots.

11. The display device of claim 9, wherein a gap exists between the first pattern and one of the dots.

12. The display device of claim 9, wherein at least one of the dots contacts the light guide plate and the reflector.

13. The display device of claim 9, wherein at least one of the dots comprises:
a glue; and
plural particles disposed in the glue.

14. The display device of claim 13, wherein the particles are reflective particles.

15. The display device of claim 13, wherein at least two of the particles have different sizes.

16. The display device of claim 9, wherein the reflector comprises a matrix layer and a reflective layer, and the matrix layer is disposed between the reflective layer and the second pattern.

17. The display device of claim 16, wherein the matrix layer comprises a transparent matrix.

18. The display device of claim 1, wherein the backlight module further comprises a third pattern, the third pattern is disposed between the light guide plate and the reflector, and the third pattern corresponds to the first pattern.

19. The display device of claim 18, wherein the third pattern is formed by a light absorbing material.

20. The display device of claim 19, wherein an absorbance of the light absorbing material is greater than 20%.

* * * * *